(12) United States Patent
Kim

(10) Patent No.: US 12,079,843 B2
(45) Date of Patent: *Sep. 3, 2024

(54) ON-LINE ADVERTISEMENT METHOD USING ADVERTISEMENT WEBSITE

(71) Applicant: Sung Wan Kim, Geoje-si (KR)

(72) Inventor: Sung Wan Kim, Geoje-si (KR)

( * ) Notice: Subject to any disclaimer, the term of this patent is extended or adjusted under 35 U.S.C. 154(b) by 204 days.

This patent is subject to a terminal disclaimer.

(21) Appl. No.: 17/684,649

(22) Filed: Mar. 2, 2022

(65) Prior Publication Data

US 2022/0188879 A1    Jun. 16, 2022

Related U.S. Application Data

(63) Continuation of application No. 15/874,339, filed on Jan. 18, 2018, now Pat. No. 11,295,348, which is a continuation of application No. PCT/KR2016/008272, filed on Jul. 28, 2016.

(30) Foreign Application Priority Data

Jul. 29, 2015 (KR) .................. 10-2015-0107034
Jul. 20, 2016 (KR) .................. 10-2016-0092184

(51) Int. Cl.
G06Q 30/02         (2023.01)
G06Q 30/0241       (2023.01)
G06Q 30/0251       (2023.01)
G06Q 30/0272       (2023.01)
G06Q 30/0273       (2023.01)

(52) U.S. Cl.
CPC ..... *G06Q 30/0277* (2013.01); *G06Q 30/0255* (2013.01); *G06Q 30/0272* (2013.01); *G06Q 30/0273* (2013.01); *G06Q 30/0275* (2013.01)

(58) Field of Classification Search
None
See application file for complete search history.

(56) References Cited

U.S. PATENT DOCUMENTS

| | | |
|---|---|---|
| 5,794,210 A | 8/1998 | Goldhaber et al. |
| 2002/0046114 A1 | 4/2002 | Kobayashi |
| 2004/0186774 A1 | 9/2004 | Lee |
| 2005/0050027 A1 | 3/2005 | Yeh et al. |
| 2005/0256766 A1 | 11/2005 | Garcia et al. |
| 2006/0010108 A1 | 1/2006 | Greenberg |

(Continued)

FOREIGN PATENT DOCUMENTS

| | | |
|---|---|---|
| CN | 102063451 A | 5/2011 |
| CN | 103339647 A | 10/2013 |

(Continued)

OTHER PUBLICATIONS

A Location Based Advertisement Scheme using OpenStreetMap, Rifat et al., 978-1-4673-4836-2/12/2012 IEEE.*

(Continued)

*Primary Examiner* — David J Stoltenberg
(74) *Attorney, Agent, or Firm* — Studebaker & Brackett PC

(57) ABSTRACT

Disclosed is an on-line advertisement method using an advertisement website. An on-line advertisement method according to an embodiment of the present invention provides an advertisement available to a user terminal at a current position of a user terminal which accesses an advertisement website.

16 Claims, 9 Drawing Sheets

(56) References Cited

U.S. PATENT DOCUMENTS

| | | |
|---|---|---|
| 2006/0271281 A1 | 11/2006 | Ahn et al. |
| 2007/0100802 A1 | 5/2007 | Celik |
| 2007/0143345 A1 | 6/2007 | Jones et al. |
| 2007/0192369 A1 | 8/2007 | Gross |
| 2007/0198339 A1 | 8/2007 | Shen et al. |
| 2007/0208616 A1 | 9/2007 | Choi |
| 2008/0010126 A1 | 1/2008 | Gunshor et al. |
| 2008/0221986 A1 | 9/2008 | Soicher et al. |
| 2009/0006211 A1 | 1/2009 | Perry et al. |
| 2009/0012866 A1 | 1/2009 | Celik et al. |
| 2009/0138445 A1 | 5/2009 | White et al. |
| 2009/0199114 A1* | 8/2009 | Lewis ............... G06Q 30/02 715/763 |
| 2009/0210316 A1 | 8/2009 | Chu et al. |
| 2009/0265243 A1 | 10/2009 | Karassner et al. |
| 2010/0036883 A1 | 2/2010 | Valencia-Campo et al. |
| 2010/0070351 A1 | 3/2010 | Kang |
| 2010/0153212 A1 | 6/2010 | Stoll |
| 2010/0241507 A1 | 9/2010 | Quinn et al. |
| 2010/0293057 A1 | 11/2010 | Haveliwala et al. |
| 2010/0299200 A1 | 11/2010 | Delli Santi et al. |
| 2011/0055192 A1 | 3/2011 | Tang et al. |
| 2011/0066484 A1 | 3/2011 | Cha et al. |
| 2011/0071894 A1 | 3/2011 | Nesamoney et al. |
| 2011/0191151 A1 | 8/2011 | Rosa |
| 2011/0208852 A1 | 8/2011 | Looney et al. |
| 2011/0218961 A1 | 9/2011 | Johnson et al. |
| 2011/0319149 A1 | 12/2011 | Hwang |
| 2012/0036015 A1 | 2/2012 | Sheikh |
| 2012/0054001 A1 | 3/2012 | Zivkovic et al. |
| 2012/0059708 A1 | 3/2012 | Galas et al. |
| 2012/0072291 A1 | 3/2012 | Bharat |
| 2012/0116897 A1 | 5/2012 | Klinger et al. |
| 2012/0143699 A1 | 6/2012 | Moon et al. |
| 2012/0150901 A1 | 6/2012 | Johnson et al. |
| 2012/0158519 A1 | 6/2012 | Edwards |
| 2012/0192220 A1 | 7/2012 | Wyatt et al. |
| 2012/0246003 A1 | 9/2012 | Hart et al. |
| 2012/0271694 A1 | 10/2012 | Lee et al. |
| 2012/0272278 A1 | 10/2012 | Bedi |
| 2012/0311462 A1* | 12/2012 | Devecka ............ G06Q 30/0255 715/753 |
| 2013/0054351 A1 | 2/2013 | Krugman et al. |
| 2013/0166381 A1 | 6/2013 | Umeda |
| 2013/0179243 A1 | 7/2013 | Wescott |
| 2013/0246163 A1 | 9/2013 | Kim |
| 2013/0304577 A1 | 11/2013 | Cintra |
| 2014/0025501 A1 | 1/2014 | Rothschild et al. |
| 2014/0040225 A1 | 2/2014 | Krit et al. |
| 2014/0040228 A1 | 2/2014 | Kritt et al. |
| 2014/0058812 A1 | 2/2014 | Bender et al. |
| 2014/0108122 A1 | 4/2014 | Chen et al. |
| 2014/0122232 A1 | 5/2014 | Press et al. |
| 2014/0143085 A1 | 5/2014 | Tarbell et al. |
| 2014/0181634 A1 | 6/2014 | Compain et al. |
| 2014/0214551 A1 | 7/2014 | Baluja et al. |
| 2014/0222854 A1 | 8/2014 | Lee et al. |
| 2014/0236946 A1* | 8/2014 | Abhyanker ............ G06Q 50/01 707/737 |
| 2014/0316893 A1 | 10/2014 | Yeh et al. |
| 2014/0351248 A1 | 11/2014 | White et al. |
| 2015/0019338 A1 | 1/2015 | Sotomayor |
| 2015/0019347 A1 | 1/2015 | Naghdy et al. |
| 2015/0066656 A1 | 3/2015 | Edwards |
| 2015/0100425 A1 | 4/2015 | Gross |
| 2015/0106388 A1* | 4/2015 | Sultzaberger ...... G06Q 30/0256 707/748 |
| 2015/0121184 A1 | 4/2015 | Steinmann et al. |
| 2015/0170210 A1* | 6/2015 | Rhee ...................... G06Q 30/02 705/14.64 |
| 2015/0178786 A1 | 6/2015 | Claessens |
| 2016/0034954 A1 | 2/2016 | Tollinger et al. |
| 2016/0055531 A1* | 2/2016 | Costa .................... G06Q 50/01 705/14.55 |
| 2016/0321701 A1 | 11/2016 | Tollinger et al. |
| 2017/0324805 A1 | 11/2017 | Charaniya et al. |
| 2018/0144376 A1 | 5/2018 | Kim |

FOREIGN PATENT DOCUMENTS

| | | | |
|---|---|---|---|
| CN | 103703484 A | 4/2014 | |
| JP | 2002-063184 A | 2/2002 | |
| JP | 2002-207669 A | 7/2002 | |
| JP | 2002-259794 A | 9/2002 | |
| JP | 2006-201985 A | 8/2006 | |
| JP | 2007-065951 A | 3/2007 | |
| JP | 2008-500630 A | 1/2008 | |
| JP | 2008-282136 A | 11/2008 | |
| JP | 2009-157682 A * | 7/2009 | ............ G09F 19/00 |
| KR | 10-2000-0024311 A | 5/2000 | |
| KR | 10-2003-0035269 A | 5/2003 | |
| KR | 10-2010-0112737 A | 10/2010 | |
| KR | 10-2012-0000179 A | 1/2012 | |
| KR | 10-1140078 B1 | 4/2012 | |
| KR | 10-1274388 B1 | 6/2013 | |
| KR | 10-2015-0010854 A | 1/2015 | |
| KR | 10-2017-0044846 A | 4/2017 | |
| WO | 2001/001217 A2 | 1/2001 | |
| WO | 2006/004800 A2 | 1/2006 | |
| WO | 2008/056578 A1 | 5/2008 | |
| WO | 2008/064422 A1 | 6/2008 | |
| WO | 2012/070899 A2 | 5/2012 | |
| WO | 2014/197635 A2 | 12/2014 | |
| WO | 2015/048338 A1 | 4/2015 | |
| WO | 2015/063526 A1 | 5/2015 | |

OTHER PUBLICATIONS

Mobile Advertising Using Location Based Services, Shoaibi et al., First IEEE International Conference on Internet Operating Systems and New Applications, 978-0-7695-4936-1/12/2012 IEEE.*

An Office Action mailed by the Japanese Patent Office on Apr. 26, 2022, which corresponds to Japanese Patent Application No. 2021-028630 and is related to U.S. Appl. No. 17/684,649; with English language translation.

Substantive Examination Clear Report mailed by Intellectual Property Corporation of Malaysia on Apr. 12, 2022, which corresponds to Malaysian Patent Application No. PI 2018700175 and is related to U.S. Appl. No. 17/684,649.

An Office Action mailed by China National Intellectual Property Administration on Apr. 1, 2021, which corresponds to Chinese U.S. Appl. No. 15/874,339.3 and is related to U.S. Appl. No. 15/874,339.

Communication pursuant to Article 94(3) EPC issued by the European Patent Office on Dec. 21, 2020, which corresponds to European Patent Application No. 16 830 855.9-1213 and is related to U.S. Appl. No. 15/874,339.

An Office Action mailed by the Brazilian Patent Office on Jul. 24, 2020, which corresponds to Brazilian Patent Application No. 112018001474-5 and is related to U.S. Appl. No. 15/874,339.

International Search Report issued for corresponding International Patent Application No. PCT/KR2016/008272, mailed on Nov. 10, 2016, with an English translation.

* cited by examiner

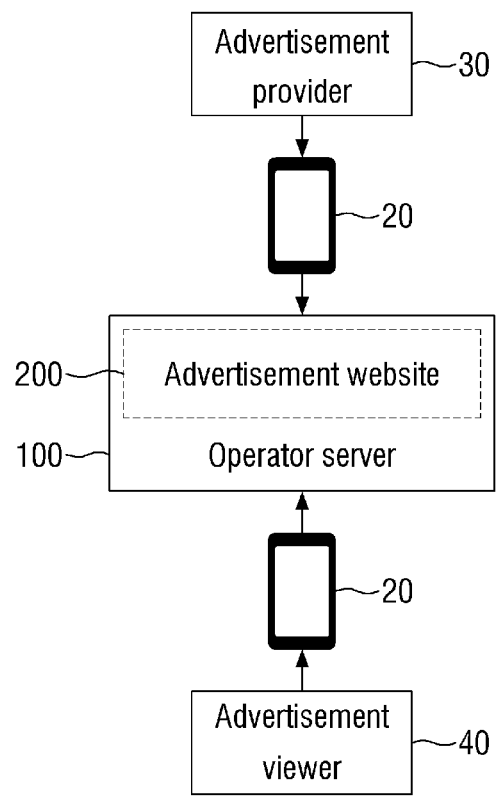
[FIG. 1]

[FIG. 2]
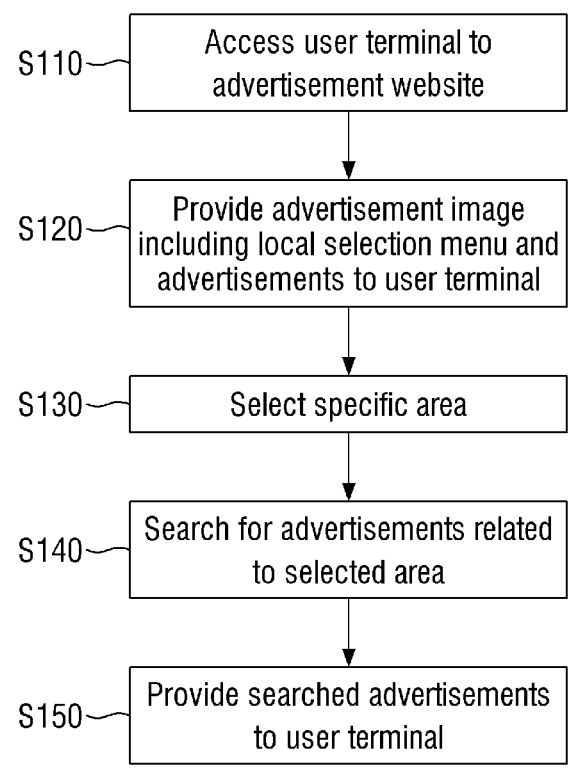

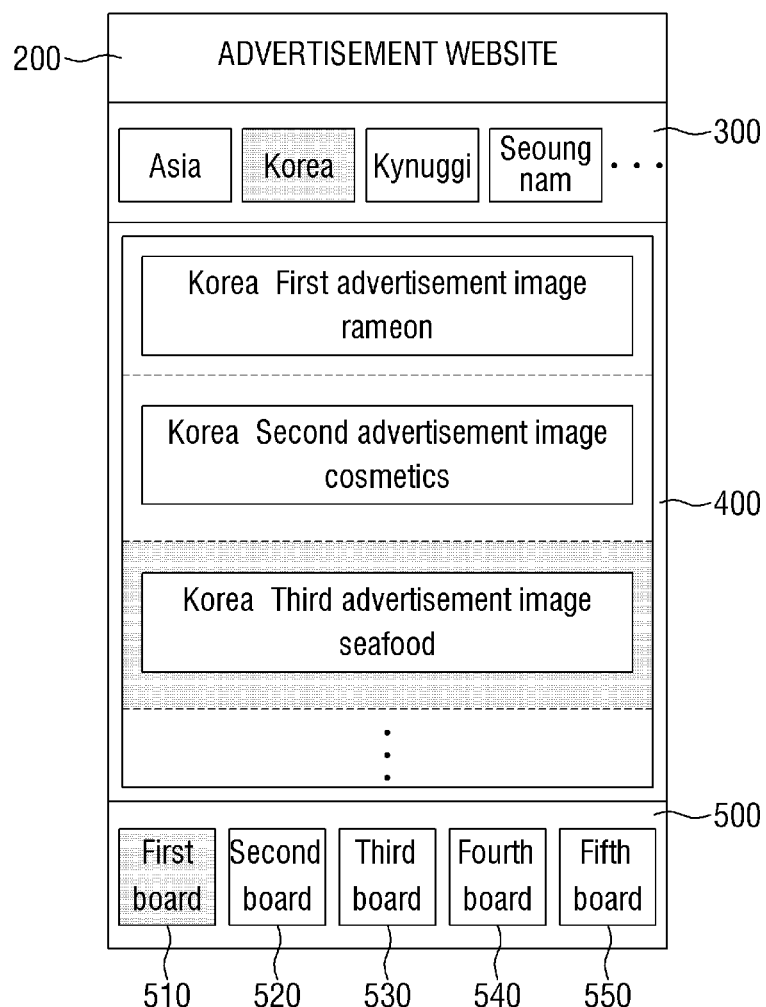

[FIG. 4]
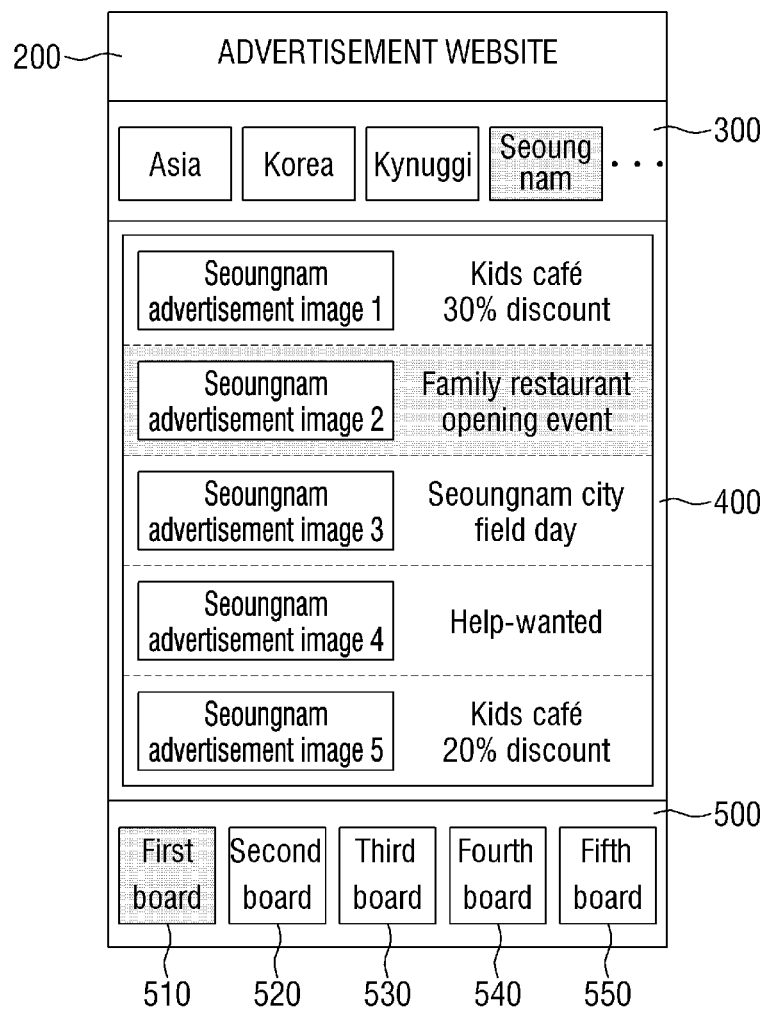

[FIG. 5]
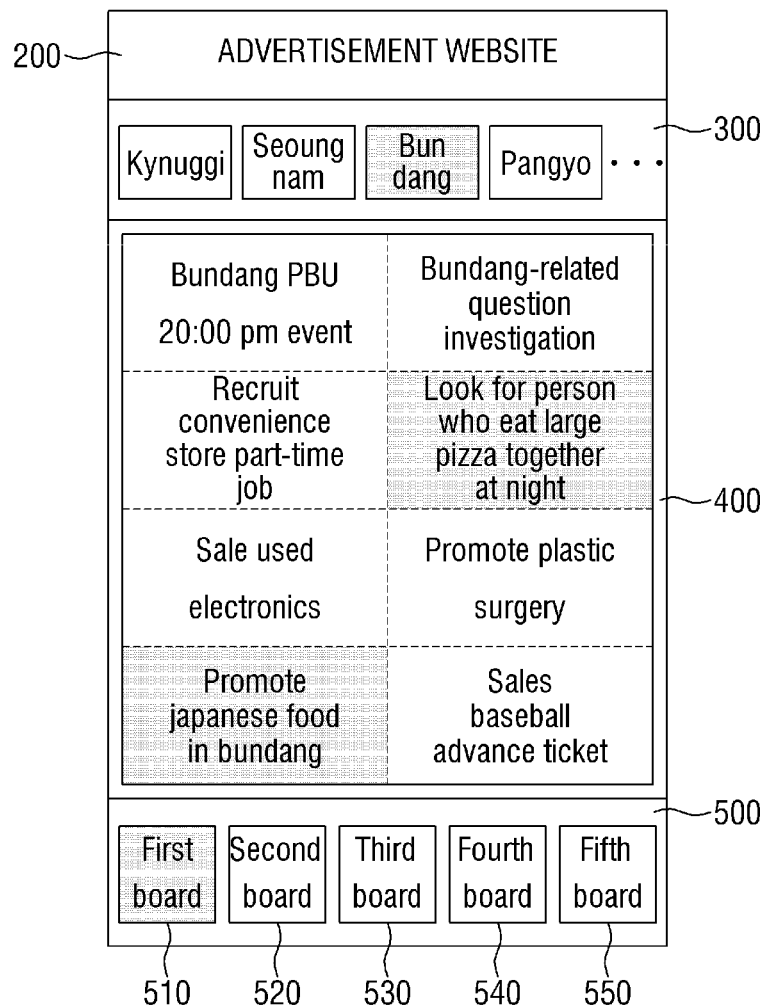

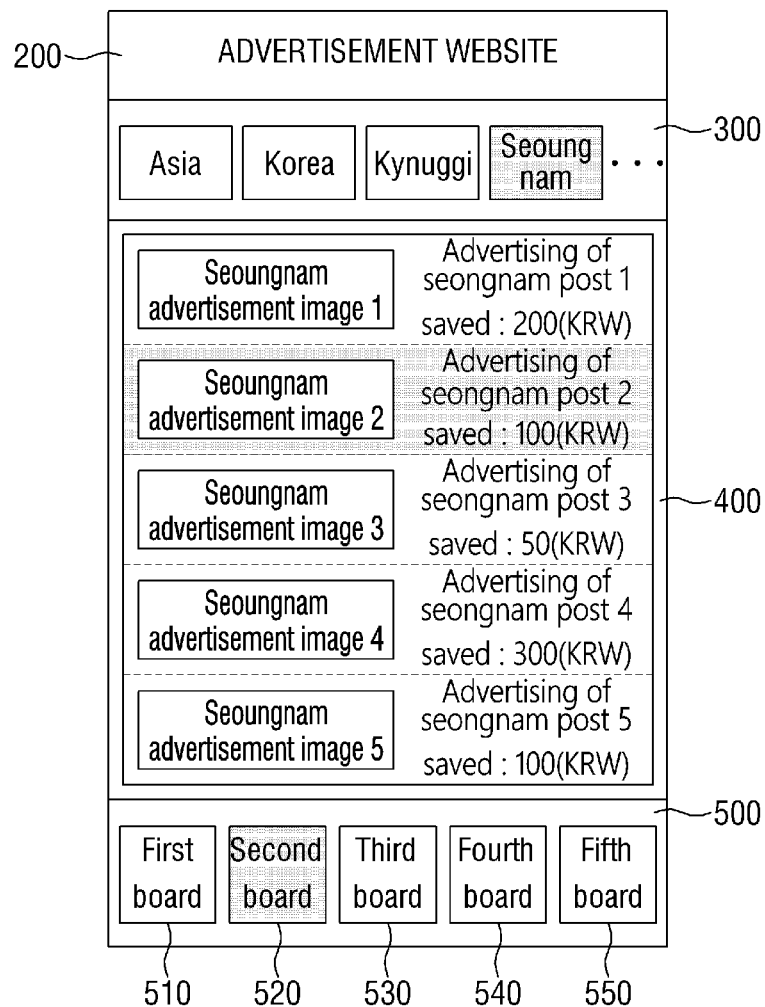
[FIG. 6]

[FIG. 7]
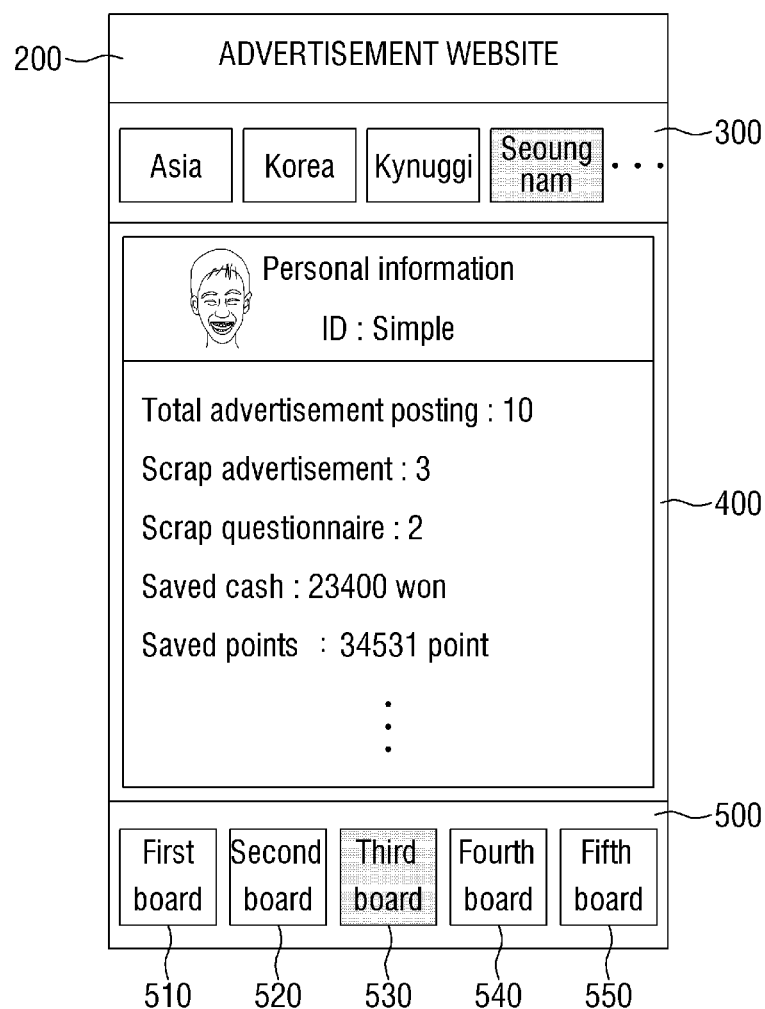

[FIG. 8]
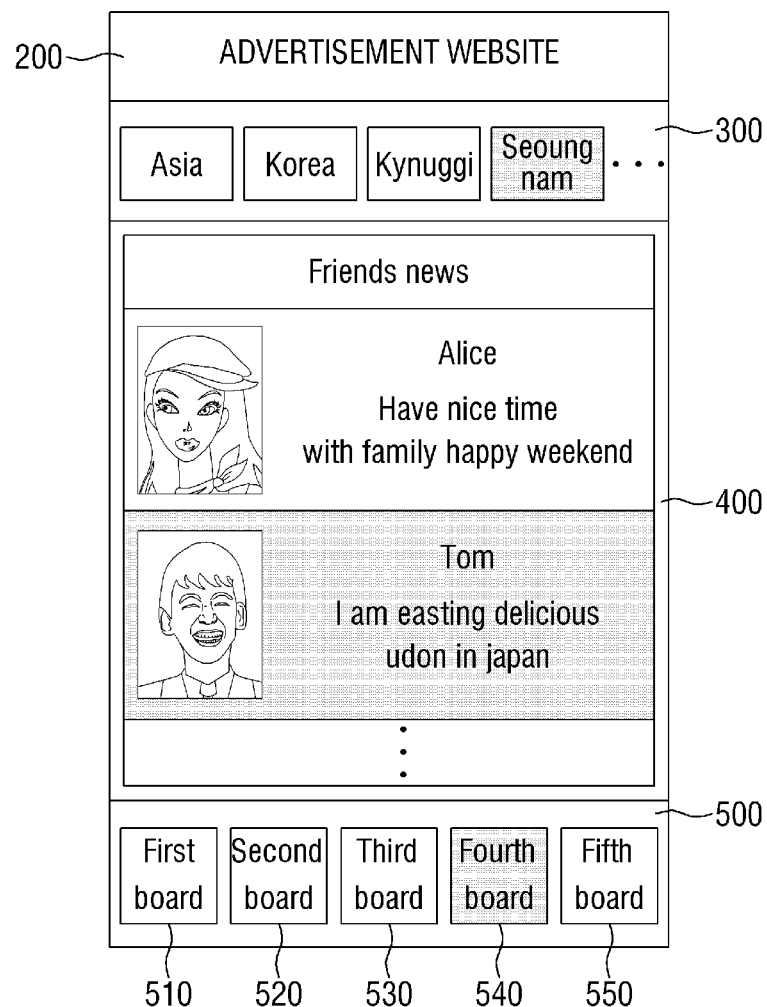

[FIG. 9]
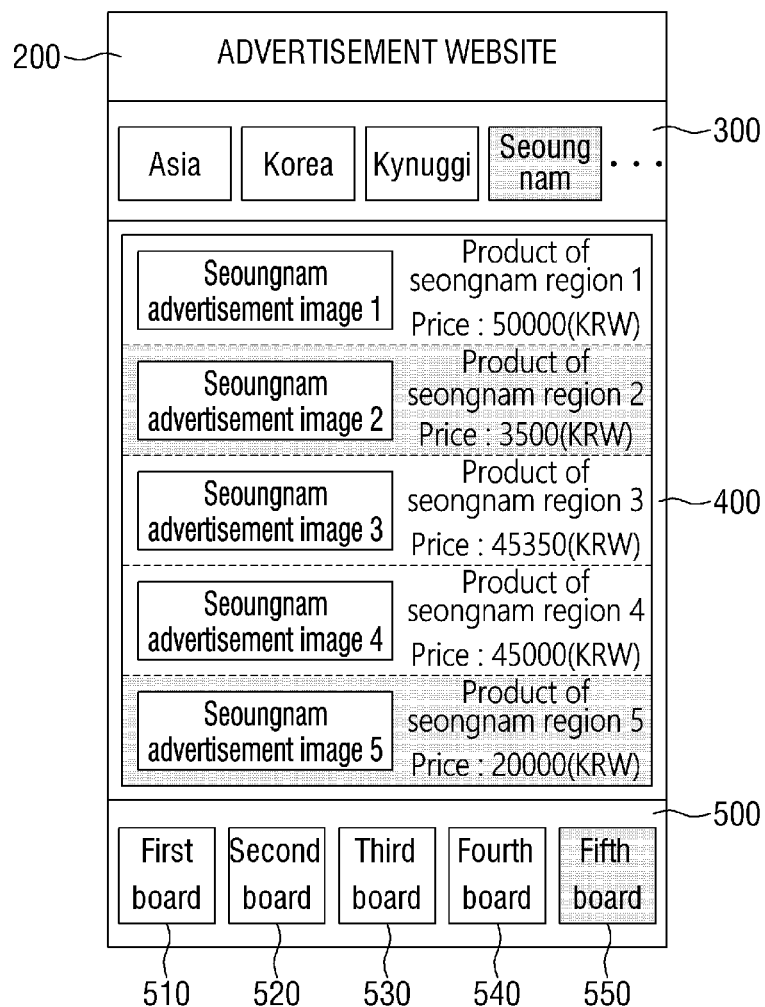

ON-LINE ADVERTISEMENT METHOD USING ADVERTISEMENT WEBSITE

CROSS-REFERENCE TO RELATED APPLICATIONS

This application is a continuation application of U.S. patent application Ser. No. 15/874,339 filed on Jan. 18, 2018, which is a continuation application of international application PCT/KR2016/008272 filed on Jul. 28, 2016, which claims priority from both Korean Patent Application No. 10-2016-0092184 filed on Jul. 20, 2016 in the Korean Intellectual Property Office, and from Korean Patent Application No. 10-2015-0107034 filed on Jul. 29, 2015 in the Korean Intellectual Property Office, the contents of each are herein wholly incorporated by reference.

FIELD

The present invention relates to an on-line advertisement method, and more particularly, to an on-line advertisement method using an advertisement website.

BACKGROUND

Generally, an advertisement is a one-way communication with the aim of notifying potential consumers of information on products and services and purchasing methods, and has an object of directly reaching sales, that is, a commercial purpose.

Furthermore, a public relation is a propaganda by which a government agencies, companies, organizations, or individuals widely notify the purpose of business in order to obtain public confidence and understanding and attract attention, and has an object of constructing images and obtain awareness and preference, that is, a non-commercial purpose.

At the present day, a lot of candidates and information emerge in various media and global society, and among them, the acts of notifying themselves or their wills become increasingly intense. Accordingly, a public relation is comparatively lower in cost than the advertisement, it is required to make advertisement incurring a great expense in order to have a republic relation effect for people.

However, these advertisements have many problems. There are problems in which, in the case of an advertiser, on-line or offline media with high advertising effectiveness has higher advertisement cost, it is difficult to know how advertisement effect occurs, and the recognition of the advertisement disappears from the consumers after the end of the advertisement contract.

Also, from the viewpoint of consumers who watch the advertisements, they don't like advertisements that are unnecessary to themselves or not interested, and there is a problem of distrust of advertisement thought as exaggerative advertisement.

Furthermore, there is also a problem that advertisements that have spent a lot of expenses and research by companies and individuals are not utilized as another valuable information besides temporary public relation means.

SUMMARY

An object of the present invention provides an on-line advertisement method using an advertisement website that provides advertisements of areas corresponding to an access position of a current user terminal when the user terminal is accessed to an advertisement website which offers advertisements for each area.

The objects to be solved by the present invention are not limited to the objects mentioned above but other objects which have not been mentioned can be clearly understood by a person with knowledge in the technical field to which the invention pertains from the description below.

A method for on-line advertisement using an advertisement website according to the present invention for achieving the above object includes accessing to an advertisement website in which advertisements of each area are posted, using a user terminal; providing the advertisement image to the user terminal so that a local selection menu for selecting at least one of an area to which the user terminal is accessed and at least one upper area including the accessed area, and an advertisement image including the advertisements are displayed on the user terminal; when a signal notifying that a specific area is selected is received from the user terminal via the local selection menu, searching for advertisements related to the selected specific area among the advertisements registered in the advertisement website; and providing searched advertisements to the user terminal for the designated time such that the searched advertisements are displayed on a screen of the user terminal for the time designated for each advertisement.

The on-line advertisement method using the advertisement website according to the present invention has an effect of providing advertisements available to the user terminal at the current position of the user terminal accessing the advertisement website, thereby providing advertisements that are substantially available at the current position to the user of the website.

BRIEF DESCRIPTION OF THE DRAWINGS

FIG. 1 is a schematic configuration diagram of on-line advertisement using an advertisement website according to an embodiment of the present invention;

FIG. 2 is a flowchart illustrating an on-line advertisement method using an advertisement website according to an embodiment of the present invention; and FIG. 3 is an explanatory diagrams illustrating an on-line advertisement process using an advertisement website according to an embodiment of the present invention.

FIG. 4 is an explanatory diagrams illustrating an on-line advertisement process using an advertisement website according to an embodiment of the present invention.

FIG. 5 is an explanatory diagrams illustrating an on-line advertisement process using an advertisement website according to an embodiment of the present invention.

FIG. 6 is an explanatory diagrams illustrating an on-line advertisement process using an advertisement website according to an embodiment of the present invention.

FIG. 7 is an explanatory diagrams illustrating an on-line advertisement process using an advertisement website according to an embodiment of the present invention.

FIG. 8 is an explanatory diagrams illustrating an on-line advertisement process using an advertisement website according to an embodiment of the present invention.

FIG. 9 is an explanatory diagrams illustrating an on-line advertisement process using an advertisement website according to an embodiment of the present invention.

DETAILED DESCRIPTION OF THE INVENTION

The aforementioned objects, features and advantages will be more clearly understood from the following detailed description taken in conjunction with the accompanying drawings. Accordingly, those having ordinary knowledge will be able to easily carry out the technical idea of the present invention. In the description of the present invention, when it is determined that a specific explanation on known technique related to the present invention may unnecessarily obscure the gist of the present invention, a detailed description thereof will be omitted.

FIG. 1 is a schematic configuration diagram of an on-line advertisement using an advertisement website according to an embodiment of the present invention, which includes an advertisement website 200 on which advertisements of a large number of areas are posted, a user terminal 20 accessible to the advertisement website 200, an advertisement provider 30 of each region accessed to the advertisement website 200 through the user terminal 20 to post advertisements, an advertisement viewer 40 which accesses to the advertisement website 200 via the user terminal 20 to watch and use advertisements posted in each area, and an operator server 100 which manages and operates the advertisement website 200.

At this time, the advertisement in the present invention means an act of making explanation, purchase information, public relations, or the like of at least one of a specific product, a specific government agency, a specific person, and contents.

Surveys on specific themes may also be included in the above advertisements. That is, in the advertisement in the present invention may include an act in which the advertisement provider notifies the commercial situation, and all the acts of notifying the advertisement provider to others by news, SNS messenger, etc. may also be included in the advertisement.

Further, the user terminal 20 may be accessed to an advertisement website 200 such as a computer, a laptop, a wired/wireless phone, a mobile terminal, and a smart phone, and all the electronic devices on which the application providing the advertisement website 200 can be installed and used may be included.

In addition, the advertisement website 200 is served to the user terminal 20 in the wireless Internet or mobile Internet standard via the operator server 100, or can be installed and used in the subscriber terminal 20 in the form of application generated and managed by the operator server 100.

Hereinafter, the present invention will be described in detail with reference to FIGS. 2 to 9.

Referring to FIGS. 2 to 9, when the operator server 100 detects that the user terminal 20 is accessed to the advertisement website 200 (S110), the operator server 100 provides the advertisement image to the user terminal 20 such that the local selection menu for selecting at least one of the area to which the user terminal 20 is accessed and at least one upper area including the accessed area, and an advertisement image including the advertisement are displayed on the user terminal 20.

In other words, as illustrated in FIGS. 3 to 9, the advertisement image provided to the user terminal 20 is a configuration of advertisement webpage 200 displayed on the screen of the user terminal 20. The operator server 100 grasps an area in which the user terminal 20 is accessed to the advertisement website 200, generates the advertisement website 200 including the local selection menu 300 capable of selecting two or more areas including the gasped area, an advertisement display region 400 in which the advertisements are displayed, and a bulletin board region 500 including the bulletin boards of various purposes in the advertisement website 200, and sends the generated advertisement website 200 to the user terminal 20 so that the accessed user terminal 20 is displayed.

Further, if the signal notifying selection of a specific area is received from the user terminal 20 accessed to the advertisement website 200, via the local selection menu 300 (S130), the operator server 100 searches the advertisements related to the specific area corresponding to the signal among the advertisements registered in the current advertisement website 200 (S140).

At this time, the advertisements related to the specific area may include at least one of the advertisement posted on the advertisement website 200 by the advertisement provider 30 located at the same area as the specific area among the advertisements registered in the advertisement website 200, the advertisement to be promoted in the specific area, and an advertisement which advertises a product to be sold in the specific area.

The operator server 100 provides the searched advertisements to the user terminal for the designated time such that the searched advertisements are displayed on the screen of the user terminal 20 for a time designated for each advertisement (for example, a specific time zone) (S150).

That is, all members of the advertisement website 200 include an advertisement provider 30 that posts the advertisement, and an advertisement viewer 40 who watches the advertisement, and the members who post or watch the advertisement may be advertisement providers 30 and advertisement viewers 40 at the same time.

At this time, when the advertisements are posted on the advertisement website 200, the advertisement provider 30 may set the advertisements such that the advertisements can be seen by the advertisement viewers for the designated time for each advertisement (for example, a specific time zone).

Hereinafter, the present invention will be described in more detail with reference to FIGS. 3 to 9.

FIGS. 3 to 9 illustrate the advertisement website 200 including the local selection menu 300, the advertisement display region 400, and the bulletin board region 500 according to the present invention.

As an example, as illustrated in FIG. 3, if the user terminal 20 located in Korean is accessed to the first advertisement webpage 200, within the advertisement website displayed on the screen of the user terminal 20, the local selection menu 300 includes the area items indicating the above-mentioned Korean area, Korean upper area items (Asia), and a plurality of lower area items in Korea.

Also, in the advertisement display region 400, the advertisements in which at least one of the number of viewing times of and preference is greater than or equal to the reference value for subscribers of the advertisement website among advertisements posted in the Korean area are preferentially displayed. Here, the preference indicates the reaction by the subscriber obtained by buttons such as "good" and "empathy" displayed on the advertisement, and is determined on the basis of the cumulative number of times for pushing the button.

On the other hand, a hashtag may also be used to preferentially display advertisements to be interested by the subscribers in the advertisement display region 400. The hashtag means a type of metadata which is formed to facilitate classification and search of the posts.

In the on-line advertisement method according to an embodiment of the present invention, when an advertiser posts the advertisement, it is possible to input a keyword representing the contents of the advertisement by the hashtag. At this time, a plurality of hashtags may be added in accordance with the attributes of the advertisement.

Furthermore, it is also possible to allow a subscriber to input keywords to be interested in advance.

Through the aforementioned process, the hashtag added to the advertisement is compared with the keyword input by the subscriber, and the advertisement to which the hashtag identical or similar to the keyword input by the subscriber is added may be preferentially displayed.

For example, if an arbitrary advertiser adds hashtags "a" and "b" to his/her advertisement, the advertisement may be preferentially exposed to the subscriber who inputs "a" or "b" as the keyword interested among the plurality of subscribers.

According to an embodiment of the present invention, when the user displays an advertisement to which the same hashtag as the keyword registered in advance is added, as illustrated in FIG. 3, the advertisement may be displayed in the form in which the background color or the frame of the advertisement is colored in an arbitrary color. In other words, advertisements to be interested by the users can be displayed to be seen more clearly in the eyes.

Therefore, it is possible to achieve the effect that the advertisement effect can be maximized in consideration of the preference of the subscriber.

At this time, as illustrated in FIGS. 3 to 5, the number of advertisements displayed in the advertisement display region 400 is set such that the number of the areas selected through the local selection menu 300 decreases as ascending to the upper area, the number of selected areas increases as descending to the lower area, and the number of the advertisements of each area may be limited.

As an example, three advertisements are displayed in the advertisement display region 400 in the Korean area of FIG. 3, but as illustrated in FIG. 4, when Seongnam area item is selected in the local selection menu 300 and the area zone descends to the lower area from Korean area to Seongnam area, advertisements related to the selected Seongnam area are searched and displayed in the advertisement display region 400, but five advertisements greater than the Korean area are displayed.

Further, as illustrated in FIG. 5, when a Bundang area item is selected in the local selection menu 300, and the area zone descends to the lower area from Seongnam area to Bundang area, the advertisements related to the selected Bundang area is searched and displayed in the advertisement display region 400, but eight advertisements greater than the Seongnam area are displayed.

Of course, unlike FIGS. 3 through 5, the setting can also be provided such that as the number of advertisements increases as ascending to the upper area, the number of advertisements decreases as descending to the lower area, and it is also possible to set the same number of advertisements of the upper area and the lower area.

According to an embodiment of the present invention, it is possible to utilize the population living in each area in order to determine the number of advertisements displayed in the advertisement display region 400 of the upper area and the lower area.

To this end, the on-line advertisement providing method according to the embodiment of the present invention can be provided so that the number of advertisements corresponding to the population is displayed, using the regional population database.

For example, the number may be determined such that eight advertisements are displayed in the advertisement display region 400 of an area with a population of 500,000 or less, and five advertisements are displayed in the advertisement display region 400 of an area of exceeding 500,000 and less than one million.

As described above, if the number of advertisements displayed in the advertisement display region 400 is automatically determined by utilizing the population living in each group, it is possible to automatically determine the number of advertisements without inconvenience in which the administrator needs to determine the number of advertisements displayed in the advertisement display region 400 for each area one by one.

Furthermore, the posting retention time of the advertisements displayed in the advertisement display region 400 may be gradually shorter as the area selected through the local selection menu 200 descends to the lower area.

As an example, in the Korean area of FIG. 3, advertisements related to the Korean area are posted for two hours and then exchanged with other advertisements. However, as illustrated in FIG. 4, if the Korean area descends to the lower area toward Seongnam area, the advertisements related to Seongnam may be posted for one hour shorter than the advertisements related to Korean area.

Further, the advertisements displayed in the advertisement display region 400 may be gradually moved toward the upper area than the posted area and posted in that area, when the number of viewing times or preference becomes higher than the reference value by the subscribers in the advertisement website 200.

As an example, when the number of viewing times or preference of a specific advertisement becomes higher than the first reference value among the advertisements related to Bundang area in FIG. 5, the specific advertisement is moved to the advertisement related to Seongnam area and posted in the area. When the number of viewing times or the preference of the specific advertisement moved to the advertisement related to the Seongnam area becomes higher than the second reference value (the second reference value>the first reference value), the specific advertisement may be moved to advertisement related to Gyeonggi area and posted in the area.

Further, the advertisement contents of the advertisements displayed in the advertisement display region 400 may gradually summarized and displayed, as the area selected through the local selection menu 200 descends to the lower area.

As an example, in the South Korean area in FIG. 3, advertisements related to the Korean area are displayed including images, text etc related to the public relations. However, as illustrated in FIG. 4, when the Korean area descends to the lower area toward the Seongnam area, some advertisement contents of the advertisements related to Seongnam are gradually displayed in smaller sizes than the advertisements related to the above-mentioned Korean area. As illustrated in FIG. 5, when the above-mentioned Seongnam area descends to the lower area toward the Bundang area, some texts of the advertisements related to Bundang are summarized and displayed to a gradually smaller size than the above-mentioned advertisements related to Seongnam area.

On the other hand, the advertisements displayed in the advertisement display region 400 in FIGS. 3 to 5 are advertisements capable of paying the points displayed when the first bulletin board 510 is selected and activated in the bulletin board region 500. That is, when the first bulletin board 510 is selected and activated in the bulletin board region 500, the advertisements capable of paying points are searched and displayed in the advertisement display region 400.

That is to say, the first bulletin board 510 is a bulletin board on which the advertisements that pay the points to the user terminal 20 when the user terminal 20 selects (or watches) an advertisement of another subscriber displayed in the advertisement display region 400.

Further, the user terminal 20 can post a free advertisement in the first bulletin board 510, using the paid point in the first bulletin board 510.

At this time, the user (one of the advertisement provider and the advertisement viewer) of the user terminal 20 can purchase the area for posting the advertisement on the advertisement display region 40 in the first bulletin board 510, the posting time, and the position in the advertisement display region 400, using the points paid to the user terminal 20, by auction.

Also, the points paid by the advertisement related to the upper area may be larger than the points paid by the advertisement related to the lower area among the advertisements displayed on the first bulletin board 510. As an example, the points paid by advertisements posted in the Seongnam area may be greater than the points paid by the advertisements posted in the Bundang area.

In addition, although the user of the user terminal 20 tries to post the desired advertisements, if the saved points of the user are insufficient, the user may purchase the points by cash via the advertisement website 200 or may receive the points of other users, thereby purchasing the area for posting the advertisement, the posting time, and the position in the advertisement display region 400 by auction.

In other words, the first bulletin board 510 is an SNS platform having a global advertisement (or questionnaire) function in the form of a website and an application and a commercial transaction function. The first bulletin board 510 is a platform which provides the function of a bulletin board that allows the users (advertisement providers or advertisement viewers) to post advertisements or questionnaires for free or with fee for a guaranteed period of time in a desired area and at a desired time zone anywhere in the world, and provides market functions for allowing customers of the desired areas to sell products and purchase products of the desired areas.

Next, the second bulletin board 520 selected and activated in the bulletin board region 500 in FIG. 6 is a "Power Board" which is a bulletin board that displays advertisements capable of saving cash at the time of selecting or viewing the advertisements in the advertisement display region 400.

In other words, the second bulletin board 520 is a bulletin board which receives the accumulation of cash provided by the advertisement provider 30 when the user terminal 20 completes the mission (at least one act of advertisement viewing, participation in survey, and installation of the application) posted by the advertisement provider 30. At this time, the user terminal 20 may receive the saved cash from a fifth bulletin board 550 as a market board to be described later, purchase the product advertised on the fifth bulletin board 550 with the saved cash, or exchange the cash for points of other cyber money.

Next, the third bulletin board 530 selected and activated in the bulletin board region 500 in FIG. 7 is a "My Board" which is a bulletin board for managing personal information of the user terminal 20, advertisement/questionnaire posted by the user terminal 20, advertisement/questionnaire of other subscribers scrapped by the user terminal 20, cash/points saved by the user terminal 20, and the like.

As an example, FIG. 7 illustrates a configuration in which the user's personal information of the user terminal 20, the number of advertisements scrapped by the user terminal 20 in the advertisement website 200, the number of questionnaires scrapped by the user terminal 20 in the advertisement website 200, the cash and points etc. saved by the user terminal 20 are displayed in the third bulletin board 530.

As another example, an advertisement with a hashtag identical or similar to the keyword input by the user may be displayed on the third bulletin board 530. In other words, since the advertisements to be interested by users are automatically collected and provided, the advertisement effect can be maximized.

When the advertisements to which the hashtag identical or similar to the keyword registered by user in advance are displayed on the third bulletin board 530, an optional identifier may be added to the advertisements.

Here, the identifier is used for displaying the advertisement corresponding to the keyword registered by the user in advance, and may be added to a partial region of the advertisement. Or, the identifier may be added in the manner of displaying the background color of the advertisement or the color of the frame line to be different from the general advertisement.

At this time, the identifier may be displayed in a darker color as the similarity between the hashtag added to the advertisement and the keyword registered by the user in advance is higher, or may be added in such a manner that the size of the identifier increases.

Next, the fourth bulletin board 540 selected and activated in the bulletin board region 500 in FIG. 8 is a "Friends Board". In the fourth bulletin board 540, information (including at least one of personal information and greetings of other subscribers) of other subscribers registered by the user terminal friend 20 as friends is displayed. The advertisement registered by the friends on the advertisement website 200 may be arranged and displayed in a recent time zone. When specific other subscriber information is selected by the user terminal 20, the bulletin board moves to the above "My Board" of the friend and the advertisement posted by the friend can be watched.

Similarly to the third bulletin board 530, the fourth bulletin board 540 may display advertisements with the added hashtag matching the keywords registered by the user in advance. For example, it is possible to display an advertisement to which a hashtag matching the keyword registered by another subscriber registered as a friend is added. Therefore, it is possible to check advertisements to be interested by another subscriber registered as a friend.

At this time, the advertisement displayed on the fourth bulletin board 540 may also be provided to the user in the state in which an arbitrary identifier is added as displayed on the third bulletin board 530.

On the other hand, the on-line advertisement providing method according to an embodiment of the present invention can also provide a function of sending a message to another subscriber registered as a friend as illustrated in FIG. 8.

According to an embodiment of the present invention, when sending a message to another subscriber registered as a friend, an advertisement to be interested by another subscriber may be displayed in a partial region to be sent.

For example, when sending a message to a friend A, it is possible to send an advertisement with the added hashtag matching the keyword registered by the friend A in advance together with the message. At this time, the advertisement may be sent so as to be included in a partial region of the message.

Therefore, even if the user is not accessed to the local advertisement bulletin board, it is possible to achieve the effect capable of automatically providing advertisements to be interested by the user.

Finally, the fifth bulletin board 550 selected and activated in the bulletin board region 500 in FIG. 9 is a "Market Board". The advertisements of the products that can be purchased at the cash/point saved via the advertisement website 200 are displayed on the fifth bulletin board, and the user terminal 20 can purchase the products at the cash/point saved by the user. In addition, the user terminal 20 may apply for payment of the saved cash in the fifth bulletin board 550 or exchange the saved cash for points of other cyber money.

Although the present invention has been illustrated and described in relation to a specific embodiment, a person having ordinary knowledge in the industry will be able to easily know that various modifications and changes can be made within the scope that does not depart from the spirit and scope of the invention indicated by the appended claims.

What is claimed is:

1. An on-line advertisement method performed by a user terminal and an operator server, the method comprising:
when a first bulletin board is selected by the user terminal, transmitting, by the operation server, advertisements related to a first area among the advertisements that pay user points;
displaying, by the user terminal, advertisements on the first bulletin board, the respective advertisement of the advertisements is displayed on a screen of the user terminal for the respective designated time;
selecting and watching, by the user terminal, at least one advertisement among the advertisements displayed on the first bulletin board, and obtaining, by the user terminal, one or more user points as a reward of selecting and watching the at least one advertisement;
purchasing, by the user terminal, a position on the first bulletin board for posting a free advertisement using the obtained user points;
receiving, by the user terminal, an input of at least one keyword from a user;
searching, by the operation server, for an advertisement to which the same hashtag as the keyword is added among the registered advertisements; and
displaying, by the user terminal, the searched advertisement.

2. The on-line advisement method of claim 1,
wherein the number of the advertisements on the first bulletin board is automatically determined based on the first area.

3. The on-line advisement method of claim 2,
wherein the number of the advertisements on the first bulletin board is automatically determined based on the population of the first area.

4. The on-line advisement method of claim 2,
wherein the number of the advertisements on the first bulletin board is automatically determined based on the administrative region level of the first area.

5. The on-line advisement method of claim 1,
wherein the respective designated time is automatically determined based on the first area.

6. The on-line advisement method of claim 5,
wherein the respective designated time is automatically determined based on the administrative region level of the first area.

7. The on-line advisement method of claim 1, further comprising:
providing, by the operation server, a second bulletin board that displays advertisements that pay rewards for viewing, wherein the user points have a first use and the rewards have a second use.

8. The on-line advisement method of claim 6,
wherein the rewards is used for purchasing product advertised on a fifth bulletin board.

9. The on-line advisement method of claim 1, further comprising:
providing, by the operation server, a third bulletin board that displays a first type of advertisements in a first visualization method and a second type of advertisements in a second visualization method,
wherein the second visualization method comprising adding identifier on the advertisements.

10. The on-line advisement method of claim 9,
wherein the identifier is used for displaying the advertisement corresponding to the keyword registered by the user.

11. The on-line advisement method of claim 10,
wherein the identifier is added to a partial region of the advertisement.

12. The on-line advisement method of claim 10,
wherein the identifier is added in the manner of displaying the background color of the advertisement.

13. The on-line advisement method of claim 10,
wherein the identifier is added in the manner of displaying the color of the frame line to be different from the first type of advertisement.

14. The on-line advisement method of claim 1, wherein the purchasing comprises:
receiving user points obtained by the user terminal of other user;
purchasing the position on the first bulletin board using the obtained user points and the received user points,
wherein the received user points is obtained, by the user terminal of other user, as a reward of selecting and watching the at least one advertisement on the first bulletin board.

15. The on-line advisement method of claim 1, wherein the purchasing comprises:
purchasing, by the user terminal, a position, a posting time, and an area for posting a free advertisement by auction using the obtained user points.

16. The on-line advisement method of claim 1, wherein the purchasing comprises:
purchasing user points by cash;
purchasing, the position on the first bulletin board using the obtained user points and the purchased user points,
wherein the purchased user points is obtained, by the user terminal of other user, as a reward of selecting and watching the at least one advertisement on the first bulletin board.

* * * * *